US008742901B2

(12) United States Patent
Miller et al.

(10) Patent No.: US 8,742,901 B2
(45) Date of Patent: Jun. 3, 2014

(54) MULTI-SAMPLE READING IN SLEEP MODE FOR PASSIVE INFRARED DETECTORS AND OTHER ANALOG INPUTS

(75) Inventors: Mark E. Miller, Mission Viejo, CA (US); Guy Rahamim, Chandler, AZ (US)

(73) Assignee: Conexant Systems, Inc., Irvine, CA (US)

( * ) Notice: Subject to any disclaimer, the term of this patent is extended or adjusted under 35 U.S.C. 154(b) by 666 days.

(21) Appl. No.: 13/037,091

(22) Filed: Feb. 28, 2011

(65) Prior Publication Data

US 2012/0218086 A1 Aug. 30, 2012

(51) Int. Cl.

*G06K 7/01* (2006.01)
*G01S 3/02* (2006.01)
*G06F 19/00* (2011.01)

(52) U.S. Cl.

USPC ................ 340/10.33; 340/539.11; 340/573.1; 340/573.4

(58) Field of Classification Search

CPC .............. G01S 3/02; G06F 19/00; G06K 7/01
USPC ................ 701/221, 207; 342/450; 455/127.5; 340/10.33, 539.11, 573.1, 573.4
See application file for complete search history.

(56) References Cited

U.S. PATENT DOCUMENTS 5,045,839 A * 9/1991 Ellis et al. ................ 340/539.11
5,680,102 A * 10/1997 Xydis ...................... 340/539.16
5,790,946 A * 8/1998 Rotzoll ...................... 455/343.1
6,198,913 B1 * 3/2001 Sung et al. ................. 455/343.3
6,957,593 B1 * 10/2005 Burns ............................ 73/866
7,017,057 B2 * 3/2006 Magee et al. ................. 713/320
7,155,263 B1 * 12/2006 Bergamo ...................... 455/574
7,346,336 B2 * 3/2008 Kampel et al. ............. 455/404.2
7,675,447 B1 3/2010 Coulson
8,086,200 B2 * 12/2011 Sutton et al. .................. 455/227
8,131,465 B2 * 3/2012 Eitan et al. ..................... 701/400
8,547,234 B2 * 10/2013 Maly et al. ................. 340/573.1
8,659,419 B2 * 2/2014 Cao et al. ................. 340/539.13
2007/0057779 A1 * 3/2007 Battista et al. ............. 340/425.5
2007/0288108 A1 * 12/2007 Parker et al. ..................... 700/94
2010/0149701 A1 6/2010 Drapkin et al.

OTHER PUBLICATIONS

Notice of Allowance and Fee(s) Due mailed Apr. 12, 2013, for U.S. Appl. No. 12/487,528, filed Jun. 18, 2009.

* cited by examiner

*Primary Examiner* — Nam V Nguyen
(74) *Attorney, Agent, or Firm* — John R. Thompson; Stoel Rives LLP

(57) ABSTRACT

This disclosure provides systems and methods for detecting a change in environmental conditions utilizing sampling circuitry configured to sample an environmental sensor while a processor remains in a low-power state or a sleep state. According to some embodiments, a pre-filter performs a simplified analysis of the sensor samples to determine if the processor should wake and perform additional analysis on stored sensor samples. Specific examples are provided for detecting motion using passive infrared detectors. Accordingly, systems and methods for reducing the power consumption of a motion detection system are provided herein.

22 Claims, 6 Drawing Sheets

MULTI-SAMPLE READING IN SLEEP MODE FOR PASSIVE INFRARED DETECTORS AND OTHER ANALOG INPUTS

TECHNICAL FIELD

This disclosure generally relates to systems and methods for detecting changes in environmental conditions. Specifically, the present disclosure relates to systems and methods for reducing the power consumption of a motion detector.

BACKGROUND

Alarm systems may include one or more motion detection systems configured to identify motion in a detection zone. In many instances, such motion detection systems may use a power supply, such as a battery. Motion detection systems may utilize a processor to periodically analyze the output of a motion detection sensor. For example, a processor may be configured to analyze the output of a passive infrared (PIR) sensor at a specified frequency. The processor consumes a relatively large amount of power when actively analyzing the output of the motion detection sensor, relative to the amount of power consumed by the processor in a sleep state.

The present inventors have recognized that since many motion detection systems run on batteries of limited capacity, it is desirable to reduce the power consumed by such systems. The present inventors have therefore determined that since a significant amount of the total power consumption of a motion detection system is consumed by the microprocessor, it would be desirable to increase the amount of time that a processor is in a low-power, or sleep state, by increasing the interval of time between each sample and/or increasing the number of samples stored in a memory between each analysis by the processor. Accordingly, the systems and methods described below may be used to reduce the power consumption of any of a wide variety of environmental sensor systems, including motion detection systems.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
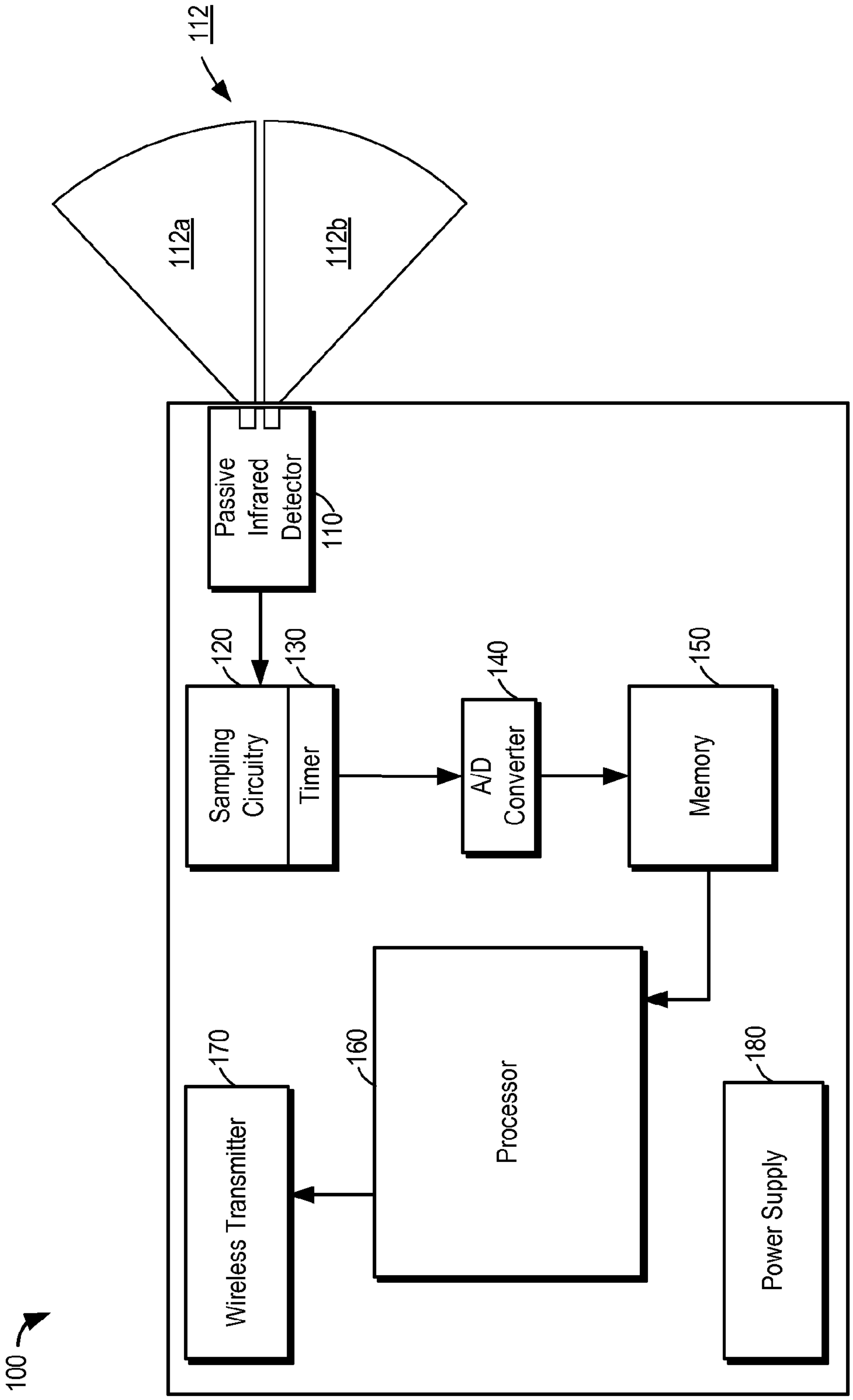
FIG. 1 illustrates one embodiment of a motion detection system including sampling circuitry configured to sample a passive infrared (PIR) detector while a processor remains in a low-power state.

The present disclosure provides systems and methods for reducing the power consumption of systems configured to detect a change in an environmental condition. According to various embodiments, a system configured to detect a change in an environmental condition may include an environmental sensor configured to detect an environmental condition, sampling circuitry, a timer, an analog to digital converter, memory, a processor, a transmitter, and a power supply. According to various embodiments, an environmental sensor may be manufactured as a discrete component or as part of an integrated circuit.

While the systems and methods described herein may be adapted to detect changes in a wide variety of environmental conditions and may utilize a wide variety of sensors adapted to detect various environmental conditions, specific examples regarding motion detection systems are provided herein. Accordingly, any of a variety of sensors useful for detecting motion may be utilized, including passive infrared (PIR) detectors having one, two, or four discrete pyroelectric sensor areas. Alternative embodiments may include sensors adapted to detect environmental conditions, such as changes in humidity, a given spectrum of electromagnetic radiation, temperature, sound, air pressure, the quantity of a particular gas, liquid, or solid, and/or any other change in an environmental condition.

According to various embodiments described herein, a motion detection system may include sampling circuitry specifically configured to sample the output of a motion detection sensor. Further, a motion detection system may also include an analog-to-digital converter configured to convert the analog output of the PIR detector to a digital signal. The digital representations of the PIR detector samples may then be stored in memory. Subsequently, the processor may analyze the stored sensor samples to determine if the samples indicate motion. If motion is detected, an alarm signal may be transmitted from the motion detection system to the alarm system.

According to alternative embodiments, an application specific integrated circuit (ASIC) may be utilized in place of a general purpose processor. While use of an ASIC may reduce power consumption, it may be more difficult to customize the resulting motion detection system. Specifically, users may be unable to select desired algorithms and communication protocols. Accordingly, ASIC-based motion detection systems may not be compatible with existing infrastructure and communication protocols. Further, an ASIC-based motion detection system may be more difficult to update, and thus it may be more difficult to utilize improved motion detection algorithms or other advances.

According to various embodiments, a sampling circuitry may be configured to periodically sample the output of a motion detection sensor and store a representation of the output in a memory. A processor may remain in a low-power (e.g., a sleep state) while the sampling circuitry stores a plurality of representations of the output of the motion detection sensor in a memory. After a threshold number of samples have been stored in the memory, a processor may wake from a low-power state and analyze the stored samples to determine if the stored samples indicate motion. The sampling circuitry may be configured to consume less power than the processor. Accordingly, less power may be consumed by activating and utilizing the processor to analyze a plurality of stored samples, rather than activating and utilizing the processor to analyze each sample individually.

Additionally, a motion detection system may include a pre-filter configured to determine if a plurality of stored samples indicates potential movement. If the pre-filter determines that there is no potential movement based on an analysis of a plurality of samples, the processor may remain in a low-power state. According to various embodiments, the processor may remain in a low-power state until the pre-filter determines that a plurality of samples potentially indicates movement. If the pre-filter determines that there is potential movement, a signal may be generated to wake the processor to perform a more complete analysis. Overall, less power may be consumed since the processor is allowed to remain in a low-power state except when potential movement is recognized by the pre-filter.

According to various embodiments, the processor may be configured to utilize various algorithms for detecting motion. Moreover, according to some embodiments, the processor may be able to discriminate between types of motion to determine if the detected motion is a triggering event or should be ignored. For example, human movement may be a triggering event, whereas movement of an insect or a pet may be ignored by the motion detection system. According to various embodiments, users may choose a motion-detection algorithm suited to a particular application. Additionally, as algorithms are improved or replaced, the systems described herein may receive software and/or firmware updates.

Thus, according to various embodiments, sampling circuitry may be configured to sample the output of a motion detection sensor at specified intervals of time. An analog to digital converter may convert the analog samples to a digital representation. A pre-filter may perform an analysis using a plurality of stored samples to determine if the samples potentially indicate movement. If the samples potentially indicate movement, a signal may be generated to wake a processor from a low-power state to determine if the potential motion is a triggering event. If the processor determines that a triggering event has occurred, a transmitter may transmit a signal indicating the detection of a triggering event.

According to various embodiments, a motion detection sensor may be sampled at any sampling rate that is appropriate for a particular application. For example, the passive infrared detector may be sampled every millisecond, every second, or at any sampling rate there between. According to some embodiments, a pre-filter may be configured to perform an analysis of a plurality of samples stored since the last analysis.

As previously stated, throughout this specification, specific examples are provided relating to motion detection systems; however, the present systems and methods are intended for use with any of a wide variety of systems configured to detect an environmental change of any kind within a specified region. For example, a system may be configured to detect changes in humidity, a given spectrum of electromagnetic radiation, temperature, sound, air pressure, the quantity of a particular gas, liquid, or solid, and/or any other change in an environmental condition. Accordingly, various sensors configured to detect changes in any number of environmental conditions may be adapted for use with the systems and methods described herein. Although the specific examples described below focus on motion detection systems and related methods, any type of environmental detection system and associated sensor(s) may be used.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. In particular, an "embodiment" may be a system, an article of manufacture (such as a computer-readable storage medium), a method, and a product of a process.

The phrases "connected to" and "in communication with" refer to any form of interaction between two or more components, including mechanical, electrical, magnetic, and electromagnetic interaction. Two components may be connected to each other even though they are not in direct contact with each other and even though there may be intermediary devices between the two components.

The phrases "wake" and "sleep" as they pertain to processors, microprocessors, and microcontrollers refer to the amount of power being consumed, and not necessarily actual states of the devices. Specifically, a state characterized as "sleep" or "low-power" may indicate that the processor, microprocessor, or microcontroller is in a state that consumes less power than when the in an "active" or "awake" state. Thus, transitioning or waking from a low-power state may merely indicate that a processor, microprocessor, or microcontroller transitions from consuming relatively lower amount of power to consuming a larger amount of power. Consequently, generating a "wake signal" may merely represent a signal causing a processor perform calculations that cause the processor to consume more power than when it is not performing calculations. Alternatively, a "sleep" state may be a specific state of a processor configured to consume less power than when the processor is "awake."

Some of the infrastructure that can be used with embodiments disclosed herein is already available, such as: processors, microprocessors, microcontrollers, programming tools and techniques, digital storage media, batteries and other mobile power sources, analog-to-digital converters, analog detection devices such as passive infrared devices, and communications networks and associated infrastructure. Processors may include a special purpose processing device such as an ASIC, PAL, PLA, PLD, Field Programmable Gate Array (FPGA), or other customized or programmable device. The processor may also include a computer-readable storage device such as non-volatile memory, static RAM, dynamic RAM, ROM, CD-ROM, disk, tape, magnetic, optical, flash memory, or other computer-readable storage medium.

Suitable networks for "transmitting a signal" as described herein include one or more local area networks, wide area networks, metropolitan area networks, and/or "Internet" or internet protocol (IP) networks, such as the World Wide Web, a private Internet, a secure Internet, a value-added network, a virtual private network, an extranet, an intranet, or even standalone devices which communicate with other devices by physical transport of media. In particular, a suitable network may be formed from parts or entireties of two or more other networks, including networks using disparate hardware and network communication technologies. A network may incorporate landlines, wireless communication, and combinations thereof. Proprietary low-power wireless or wired communication may be employed as well.

Aspects of certain embodiments described herein may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks, or implements particular abstract data types. Additionally, software, firmware, and hardware may be interchangeably used to implement any given function described herein.

In some cases, well-known features, structures or operations are not shown or described in detail. Furthermore, the described features, structures, or operations may be combined in any suitable manner in one or more embodiments. The components of the embodiments, as generally described and illustrated in the figures herein, could be arranged and designed in a wide variety of different configurations. In addition, the steps of the described methods do not necessarily need to be executed in any specific order, or even sequentially, nor need the steps be executed only once, unless otherwise specified.

According to various embodiments, any of a wide variety of existing motion detection sensors may be utilized in conjunction with the described systems and methods. For example, passive sensors configured to detect audible sound, infrared radiation, ultrasonic sound waves, microwave radiation, and/or other portions of the electromagnetic spectrum may be utilized. Alternatively, any of a variety of active sensors may be utilized, including those configured to operate using ultrasonic sound, microwaves, x-rays, magnetic resonance, infrared, visible light, and/or the like. For clarity, the remainder of the specification refers to passive infrared PIR detectors, although any type of passive sensor, active sensor, or combination thereof may be employed in various embodiments.

The embodiments of the disclosure are best understood by reference to the drawings, wherein like parts are designated by like numerals throughout. In the following description, numerous details are provided to give a thorough understanding of various embodiments; however, the embodiments disclosed herein can be practiced without one or more of the specific details, or with other methods, components, materials, etc. In other instances, well-known structures, materials, or operations are not shown or described in detail to avoid obscuring aspects of this disclosure.

FIG. 1 illustrates an exemplary motion detection system 100 including a PIR detector 110 and sampling circuitry 120. As illustrated, PIR detector 110 may be configured to detect infrared radiation within a particular detection zone 112. Detection zone 112 may be of any shape or size as is determined suitable for a particular application. According to various embodiments, detection zone 112 may comprise 2 or more smaller detection zones, shown in the illustrated embodiment as detection zones 112A and 1128. Each of detection zones 112A and 1128 may be defined and monitored using one or more detectors, lenses, and/or mirrors associated with PIR detector 110.

Sampling circuitry 120 may operate in conjunction with a timer 130 to sample an output of PIR detector 110 at a specified sampling rate. PIR detector 110 may be sampled at any sampling rate that is suitable for a specific application. For example, sampling circuitry 120 may be configured to sample the output of PIR detector 110 every 50 milliseconds, which corresponds to a sampling rate of 20 samples per second.

An analog-to-digital converter 140 may be configured to convert the output of PIR detector 110 sampled by sampling circuitry 120 to a digital signal. The digital signal may be stored in a memory 150. According to various embodiments, a processor 160 may be configured to remain in a low-power state until a threshold number of samples are stored in memory 150.

After a threshold number of samples are stored in memory 150, processor 160 may wake from a low-power state and analyze the stored samples to determine if a triggering event has occurred. For example, processor 160 may be configured to wake and analyze a set of 200 samples. Processor 160 may be programmed with any of a wide variety of motion detection algorithms. Further, processor 160 may operate in conjunction with computer-executable instructions stored on memory 150.

According to various embodiments, processor 160 may be configured to discriminate between various types of motion to determine if a set of samples stored in memory 150 indicates a triggering event. For example, human movement may be considered a triggering event, while movement of an insect, pet, or inanimate object is ignored. Alternatively, any movement may be considered a triggering event. Processor 160 may be programmed with any of a variety of algorithms suitable for a particular application. According to various embodiments, if processor 160 determines that the samples stored in memory 150 indicate that a triggering event has occurred, wireless transmitter 170 may be configured to transmit an event signal, such as an alarm.

According to the exemplary motion detection system 100 illustrated in FIG. 1, sampling circuitry 120 samples PIR detector 110 while processor 160 remains in a low-power state. A power supply 180 may be a battery of limited capacity. Power supply 180 may be configured to provide power to the various components of motion detection system 100. Since processor 160 remains in a low-power state while sampling circuitry 120 samples PIR detector 110 at a specified sampling rate, less power is consumed than in a system in which processor 160 wakes to analyze each sample generated by PIR detector 110. Illustrating the point, processor 160 may consume less than 1 microwatt in a low-power state while consuming over 1,000 microwatts while in an active state. Sampling circuitry 120, timer 130, and memory 150 may consume significantly less power than processor 160. Accordingly, for any given sampling rate, it may be more efficient to use sampling circuitry 120 to sample PIR detector 110 and to accumulate a threshold number of samples before waking processor 160 in order to analyze the samples.

According to one embodiment, sampling circuitry 120 may be configured to sample PIR detector 110 every 20 milliseconds, which corresponds to a sampling rate of 50 samples per second. Processor 160 may be configured to awaken and to analyze the samples stored in a memory when a threshold number of samples has accumulated (e.g., 200 samples). According to this example, processor 160 wakes from a low-power state every 4 seconds to analyze the set of 200 samples most recently stored in memory 150. If processor 160 determines that the set of samples indicates a triggering event, such as human movement, a wireless transmitter 170 may transmit an event signal. Utilizing processor 160 to analyze samples stored in memory 150 (as opposed to a hardware-implemented analyzer) may allow users to select and program the processor to use desired analysis algorithms and communication protocols.

Figure 2:
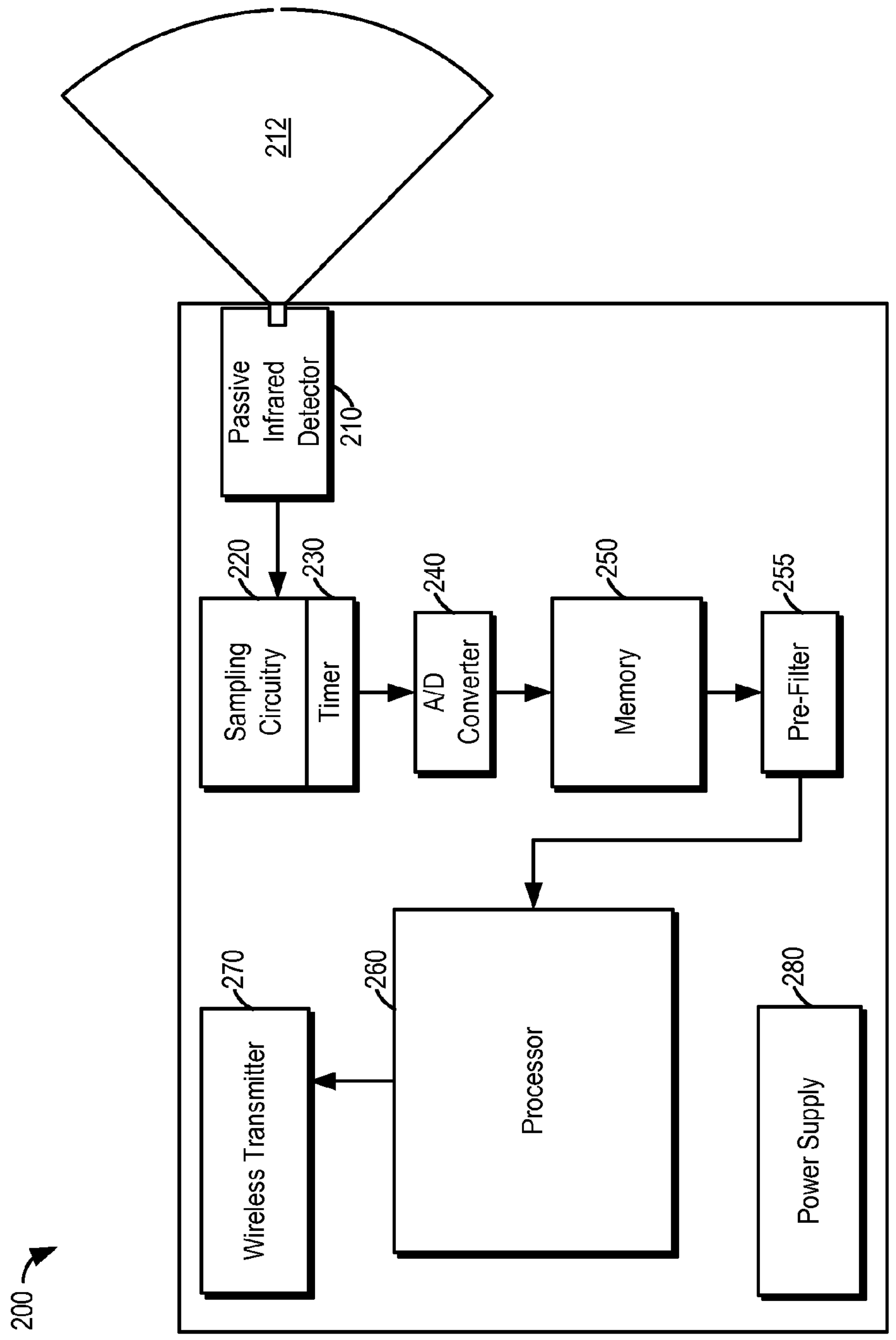
FIG. 2 illustrates one embodiment of a motion detection system including sampling circuitry and a pre-filter configured to further increase the amount of time a processor may remain in a low-power state.

FIG. 2 illustrates an exemplary motion detection system 200 including a PIR detector 210. PIR detector 210 may be configured to monitor a detection zone 212. Sampling circuitry 220 may be configured to sample an output of PIR detector 210 at a specified sampling rate, which may be specified by a timer 230. For example, sampling circuitry 220 may be configured to sample the output of PIR detector 210 at a sampling rate between 20 samples per second and 1,000 samples per second.

An analog-to-digital converter 240 may be configured to convert the output of PIR detector 210 to a digital signal. The digital signal may be stored in a memory 250. A pre-filter 255 may be configured to perform a simplified analysis of a plurality of samples stored in memory. For example, pre-filter 255 maybe configured to perform a simplified analysis of sets of 200 samples stored in memory 250. Accordingly, if sampling circuitry 220 is configured to sample PIR detector 210 every 10 milliseconds, pre-filter 255 may be configured to perform an analysis of a set of 200 samples stored in memory every 2 seconds.

According to various embodiments, pre-filter 255 is configured to perform a simplified analysis of the samples stored in memory. Pre-filter 255 may be configured to determine if a set of samples stored in memory 250 potentially indicates motion. If pre-filter 255 determines that the set of stored samples potentially indicates motion, then processor 260 may wake from a low-power state and analyze the samples stored in memory 250 to determine if the potential motion constitutes a triggering event. In contrast, if pre-filter 255 determines that the samples stored in memory 250 do not indicate potential motion, then processor 260 may remain in a low-power state while sampling circuitry 220 continues to sample the output of PIR detector 210. After the next 200 samples are stored in memory 250, pre-filter 255 may again perform the simplified analysis, as the process repeats.

The simplified analysis performed by pre-filter 255 may be simple or relatively complex. For example, the simplified analysis performed by pre-filter 255 may utilize a complex algorithm to determine if the stored samples constitute, or likely constitute, a triggering event. Alternatively, pre-filter 255 may wake processor 260 any time that a set of samples deviates from expected values or from the values stored in the last set of samples. Processor 260 may then perform a more complete analysis to determine if a triggering event has occurred. Wireless transmitter 270 may be configured to transmit a wireless event signal when processor 260 determines that a triggering event has occurred.

According to one embodiment, processor 260 may remain in a low-power state until pre-filter 255 determines that a set of samples stored in memory 250 potentially indicate movement. If there is no change in infrared energy within detection zone 212, pre-filter 255 may determine that there is no potential movement; consequently, processor 260 may not be required to process that the set of samples. Sampling circuitry 220 and pre-filter 255 may be significantly more power-efficient than processor 260 at performing their respective tasks. Thus, power supply 280, which may comprise a battery, may last longer than in a system where a processor is configured to analyze each set of samples from a PIR detector.

According to various embodiments, any combination of sampling circuitry 220, timer 230, analog-to-digital converter 240, memory 250, and/or pre-filter 255 may be implemented using one or more ASICs or FPGAs. For example, each of sampling circuitry 220, timer 230, analog-to-digital converter 240, memory 250, and/or pre-filter 255 may be implemented using discrete hardware components, ASICs, FPGAs, and/or through the use of a relatively small processor as compared to processor 260. For example, pre-filter 255 may be implemented using a 4-bit processor utilizing a fraction of the power consumed by processor 260.

According to one embodiment, sampling circuitry 220, timer 230, analog-to-digital converter 240, memory 250, pre-filter 255, processor 260, and portions of power supply 280 may be implemented as a system on a chip (SoC). Alternatively, any combination of sampling circuitry 220, timer 230, analog-to-digital converter 240, memory 250, pre-filter 255, processor 260, and/or portions of power supply 280 may be implemented as a system-in-package (SiP), comprising a number of chips in a single package. For example, sampling circuitry 220, timer 230, analog-to-digital converter 240, memory 250, and pre-filter 255 may be implemented as a first integrated circuit chip and processor 260 may be implemented as second integrated circuit chip. The first integrated circuit chip and the second integrated circuit chip may then be packaged together forming a SiP.

Figure 3:
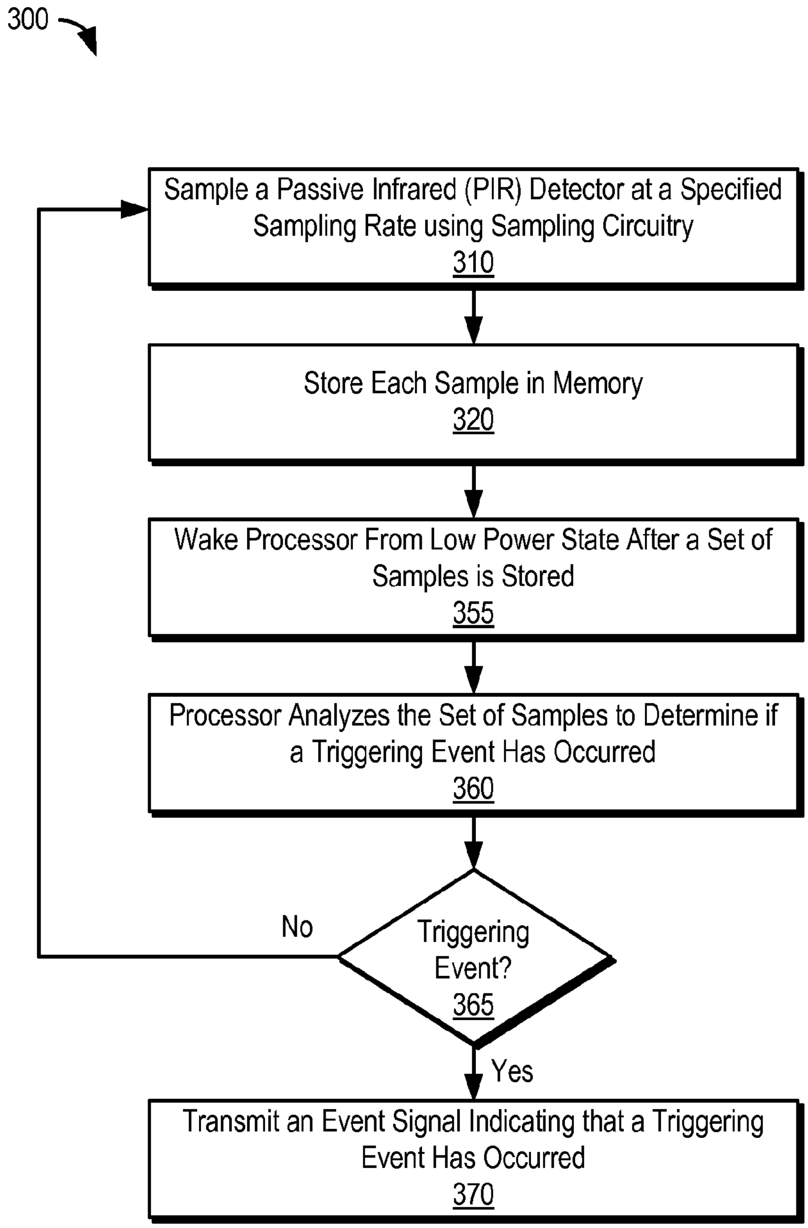
FIG. 3 illustrates a flowchart of one embodiment of a method for detecting motion by sampling the output of a PIR detector while a processor remains in a low-power sleep state.

FIG. 3 illustrates a flowchart of one embodiment of a method 300 for detecting motion that includes sampling the output of a PIR detector while a processor remains in a low-power state. As illustrated, the output of a PIR detector is sampled at a specified sampling rate using sampling circuitry, at 310. According to various embodiments, the PIR detector may be sampled at any suitable sampling rate. For example, sampling circuitry may be configured to sample the PIR detector every 20 milliseconds. Samples may be stored in memory, at 320. According to one embodiment, a processor may wake from a low-power state to analyze a set of samples stored in memory, at 355.

The processor may analyze the set of samples to determine if a triggering event has occurred, at 360. As previously described, a triggering event may constitute any detected motion, human motion, unidentified motion, unexpected motion, and/or any other change in environmental conditions. If a triggering event has occurred, at 365, an event signal may be transmitted, at 370. Otherwise, if the processor determines that a triggering event has not occurred, at 365, method 300 may repeat as the output of the PIR detector is continually sampled, at 310. According to various embodiments, sampling circuitry may continue sampling and storing the output of the PIR detector at the specified sampling rate while the processor analyzes a set of samples previously stored in memory.

Figure 4:
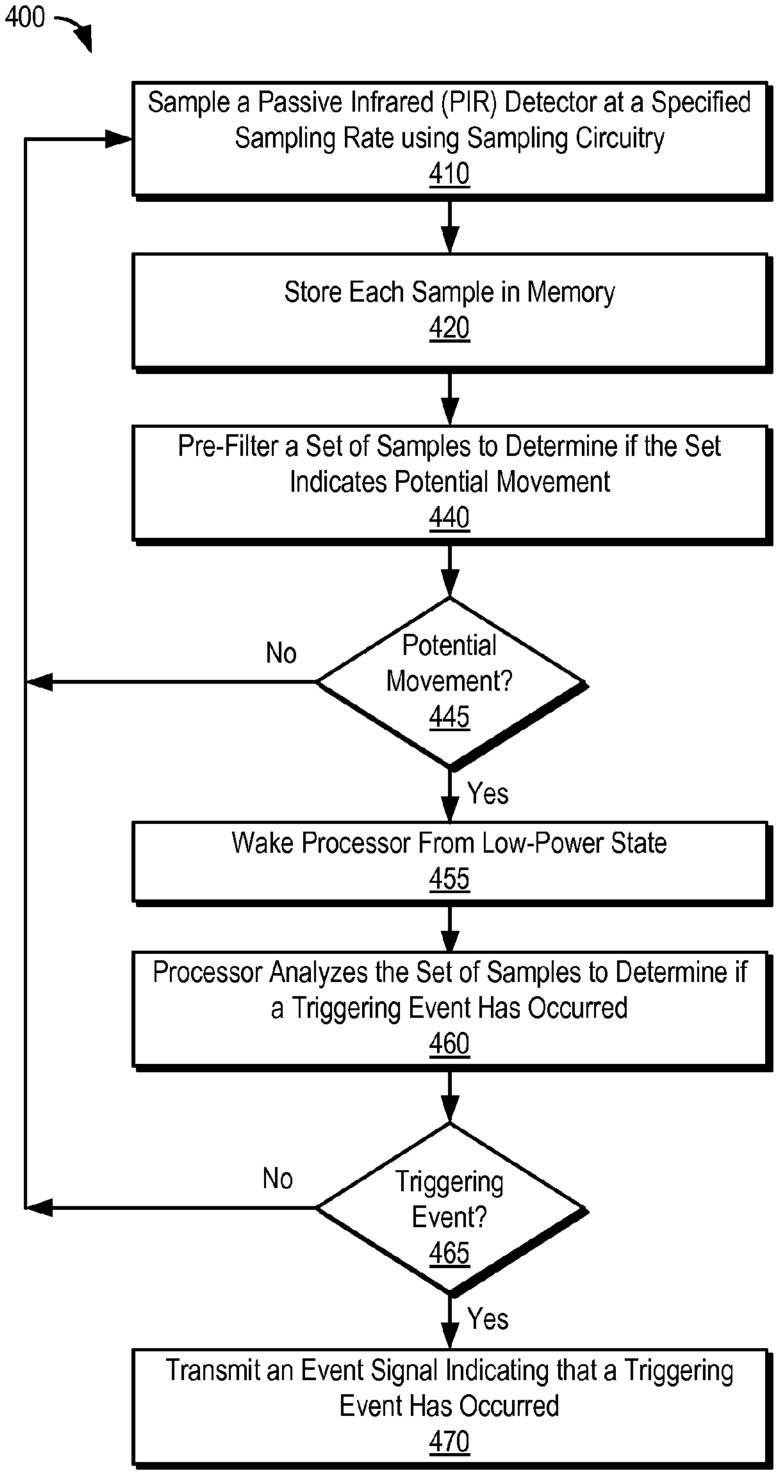
FIG. 4 illustrates a flowchart of one embodiment of a method for detecting motion using a pre-filter to further increase the amount of time a processor may remain in a low-power state.

FIG. 4 illustrates a flowchart of one embodiment of a method 400 for detecting motion that includes the use of a pre-filter to increase the amount of time that a processor may remain in a low-power state. According to one embodiment, sampling circuitry is used to sample the output of a PIR detector at a specified sampling rate, at 410. The samples are stored in memory, at 420. Subsequently, a plurality of samples is pre-filtered to determine if additional analysis should be performed, at 440. That is, a pre-filter may perform a simplified analysis of a set of samples to determine if the set of samples potentially indicates movement. As previously described, the sampling circuitry may sample the PIR detector any number of times per second. Likewise, the number of samples in a set of samples analyzed by the pre-filter may vary for a given application.

If the pre-filter determines that a particular plurality of samples do not potentially indicate movement, at 445, then the processor may remain in a low-power state as the sampling process continues, at 410. Alternatively, if the pre-filter determines that the set of samples indicates potential movement, at 445, then the processor may wake from a low-power state, at 455. The processor may then analyze the set of samples using any number of algorithms and/or programs to determine if the set of samples indicates that a triggering event has occurred, at 460.

If the processor determines that a triggering event has not occurred, at 465, the processor may revert to a low-power state as the sampling continues, at 410. If, however, the processor determines that a triggering event has occurred, at 465, then an event signal may be transmitted indicating that a triggering event has occurred, at 470.

According to various embodiments, any of steps 410 through 470 may be performed concurrently with others. For example, the sampling circuitry may continue to sample the output of the PIR detector, while the pre-filter performs a simplified analysis of a previously stored set of samples, and the processor analyzes a set of samples that the pre-filter previously determined may potentially indicate movement.

Figure 5A:
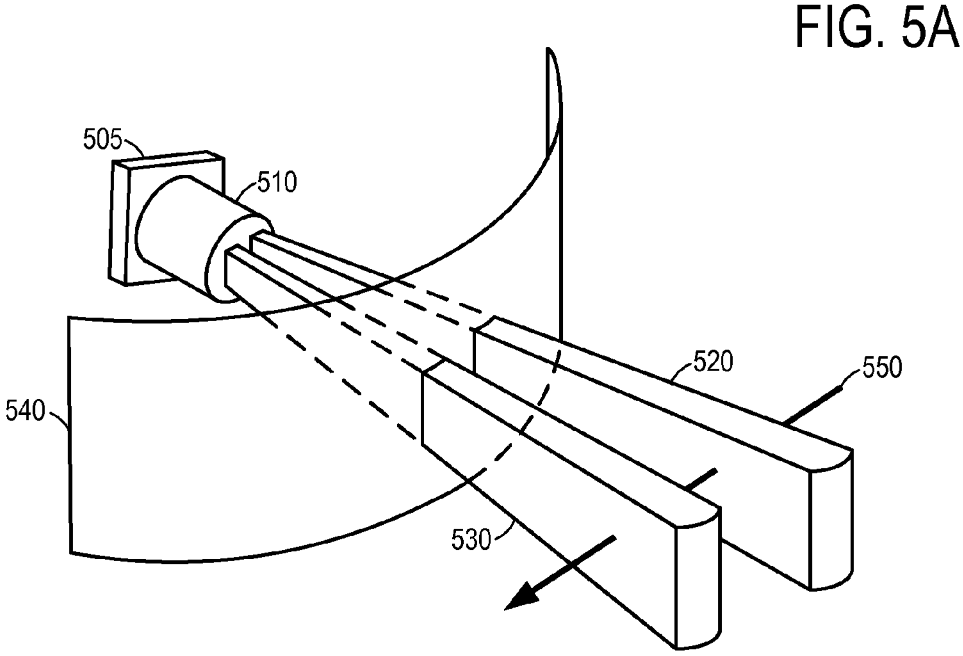
FIG. 5A and FIG. 5B illustrate conceptual representations of passive infrared detectors and associated lenses, according to various embodiments.

FIG. 5A illustrates one embodiment of a PIR detector 510 that may be used in conjunction with the presently described systems and methods. PIR detector 510 may include two discrete pyroelectric sensor areas and a sensor mount 505. As illustrated, the first pyroelectric sensor area detects infrared energy from a first zone 520 and a second pyroelectric sensor area detects infrared energy from a second zone 530. A lens 540, such as a Fresnel lens, may be configured to concentrate light from a wider region onto the pyroelectric sensor areas. According to alternative embodiments, PIR detector 510 may include one, two, four, or any other number of pyroelectric sensor areas and corresponding detection zones.

According to various embodiments, the two pyroelectric sensor areas are connected via a differential amplifier (not shown) such that the average infrared energy emitted from the detection zone is canceled out. An object emitting infrared energy, such as a human body, traveling in the direction 550 may be detected as first entering zone 520 and then passing through zone 530.

Figure 5B:
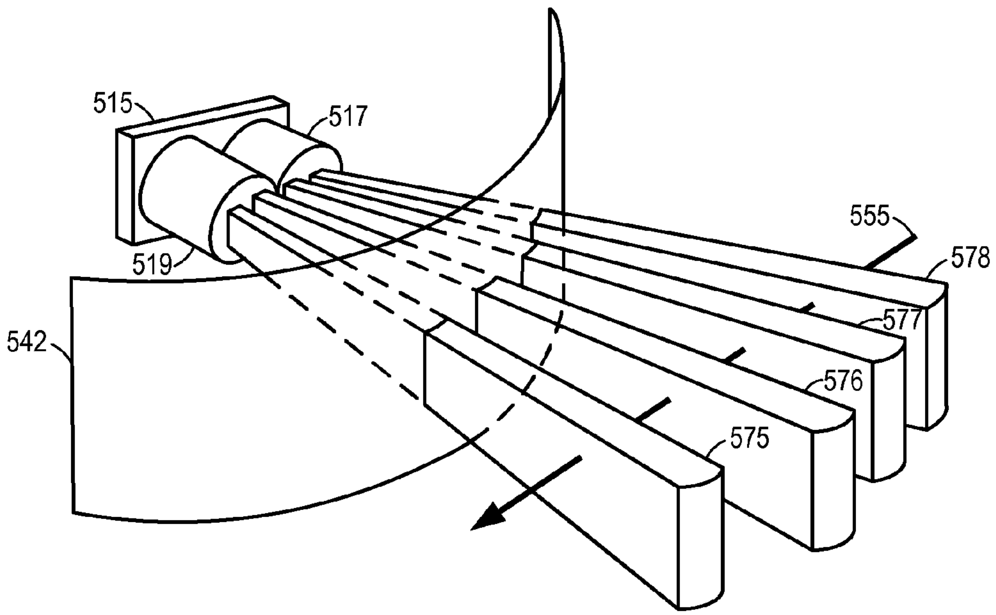

FIG. 5B illustrates a mount 515 supporting PIR detectors 517 and 519. According to various embodiments, a motion detection system, such as those described herein, may include any number of PIR detectors. According to the illustrated embodiment, each of PIR detectors 517 and 519 includes two pyroelectric sensor areas, thus creating four detection zones 575, 576, 577, and 578. According to alternative embodiments, PIR detector 517 and/or PIR detector 519 may include any number of pyroelectric sensor areas and corresponding detection zones. A lens 542 may be employed to broaden the detection zone and/or extend the detection range of PIR detectors 517 and 519.

An object emitting infrared radiation traveling in the direction 555 may be detected as entering zone 578, then 577, then 576, and finally zone 575. A motion detection system configured to sample PIR detectors may be able to analyze stored samples and determine the type of object, the direction of the object, the speed of the object, and or other characteristics of the object based on the detected infrared radiation. For example, the motion detection system may determine that the object traveling in the direction 555 is a human and may transmit a signal indicating that a triggering event has occurred.

Figure 6A:
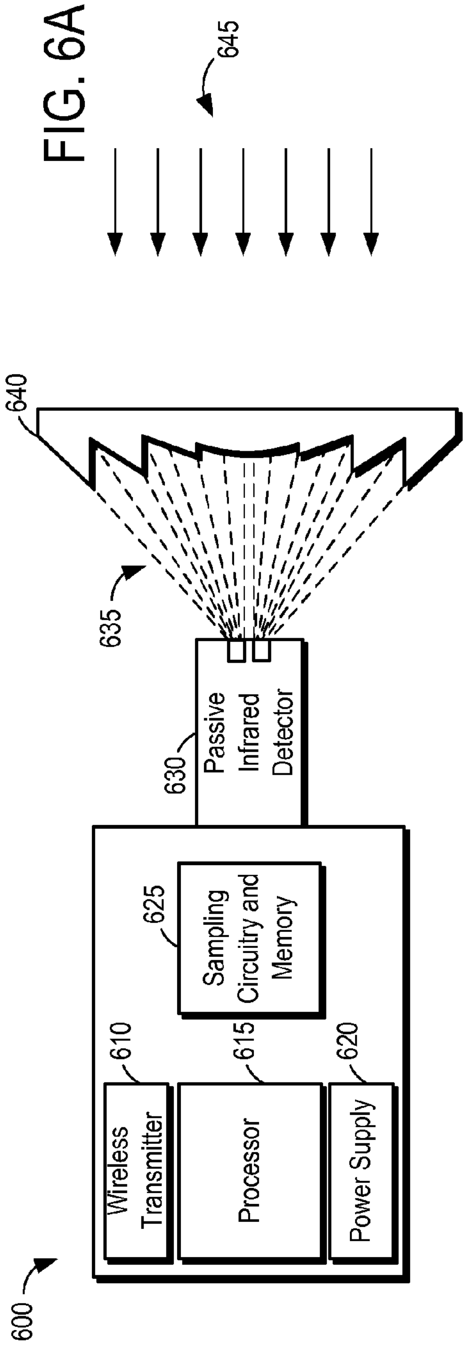
FIG. 6A illustrates a functional block diagram of one embodiment of a motion detection system including a passive infrared detector and a Fresnel lens.

FIG. 6A illustrates one embodiment of a motion detection system 600 including a PIR detector 630. As illustrated in FIG. 6A, infrared radiation 645 may be collected by a flat-faced Fresnel lens 640 and concentrated 635 onto the pyroelectric sensor areas of PIR detector 630. According to various alternative embodiments, any variety of lenses and/or mirrors may be utilized to concentrate radiation onto a sensor area of any of a wide variety of motion-detecting sensor devices.

According to various embodiments, sampling circuitry 625 may be configured to sample the output of PIR detector 630 at a specified sampling rate. For example, PIR detector 630 may be sampled every 4 milliseconds, which corresponds to a sampling rate of 250 samples per second. An analog-to-digital converter may convert the analog output of PIR detector 630 to a digital signal stored in memory 625. After a threshold number of samples has been stored in a memory, a processor 615 may be configured to analyze the set of stored samples to determine if a triggering event has occurred.

If processor 615 determines that a triggering event has occurred, a wireless transmitter 610 may transmit an event signal. Power supply 620 may be a battery and configured to power the various subsystems of motion detection system 600. Processor 615 may remain in a low-power state while sampling circuitry 625 samples the output of PIR detector 630. Accordingly, the power consumption of motion detection system 600 may be lower than a system in which a processor is configured to analyze each measurement generated by a PIR detector.

Figure 6B:
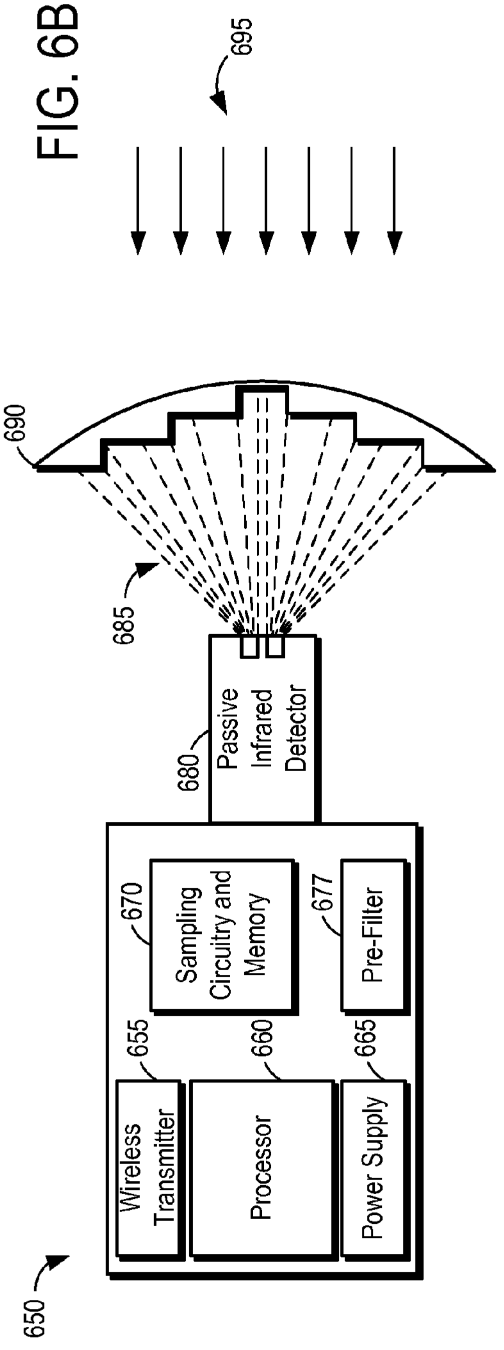
FIG. 6B illustrates a functional block diagram of one embodiment of a motion detection system including a pre-filter and an alternative Fresnel lens.

FIG. 6B illustrates an exemplary motion detection system 650 including a PIR detector 680, which is sampled using sampling circuitry 670 at a specified sampling rate. As illustrated, infrared radiation 695 may be collected by a convex Fresnel lens 690 and concentrated 685 onto the pyroelectric sensor areas of PIR detector 680. Pre-filter 677 may be configured to perform a simplified analysis of a set of samples stored in a memory to determine if processor 660 should awake to perform a full analysis of the set of samples.

According to various embodiments, if pre-filter 677 determines that the set of samples indicates that movement potentially occurred, processor 660 may be used to perform a full analysis of the set of samples to determine if a triggering event occurred. Wireless transmitter 655 may transmit a signal if processor 660 determines that a triggering event has occurred. If pre-filter 677 determines that the set of stored samples does not indicate any potential motion, then processor 660 may remain in a low-power state while the sampling process continues. According to various embodiments, power supply 665 may be a battery of limited capacity. By sampling PIR detector 680 with sampling circuitry 670 and using pre-filter 677 to reduce the amount of time processor 660 is in an active or awake state, the battery life of motion detection system 650 may be extended.

While various descriptions and examples provided herein have focused on the use of passive infrared detectors, the presently described systems and methods may be used in conjunction with any type of environmental sensor, including both active and passive sensors. Moreover, the presently described systems and methods may be adapted to detect and/or record various alternative environmental changes in addition to motion. The above description provides numerous specific details for a thorough understanding of the embodiments described herein; however, one or more of the specific details may be omitted, modified, and/or replaced by a similar process or system.

What is claimed:

1. A system configured to detect a change in an environmental condition comprising:

an environmental sensor configured to detect an environmental condition;

sampling circuitry configured to sample the environmental sensor at a specified sampling rate;

a memory configured to store samples generated by the sampling circuitry;

a pre-filter configured to generate a wake signal after more than a predetermined number of samples have been stored;

a processor configured to:

periodically wake from a low-power state when the wake signal is received;

analyze the environmental sensor samples stored in the memory and to determine that a triggering event has occurred; and generate an event signal; and a transmitter configured to transmit the event signal.

2. The system of claim 1, wherein the environmental sensor comprises a passive infrared detector and the environmental condition comprises infrared radiation.

3. The system of claim 1, wherein the triggering event comprises human movement.

4. The system of claim 1, wherein the specified sampling rate is between 20 samples per second and 1,000 samples per second.

5. The system of claim 1, wherein the threshold number of environmental sensor samples comprises between 10 and 300 samples.

6. A method for detecting a change in an environmental condition, comprising:

sampling, at a specified sampling rate, an environmental sensor configured to detect an environmental condition;

storing samples representing the environmental condition in a memory;

generating a wake signal after more than a predetermined number of samples have been stored;

waking a processor from a low-power state when the wake signal is received;

analyzing, using the processor, the environmental sensor samples stored in the memory;

determining that a triggering event has occurred based on the analysis of the environmental sensor samples stored in the memory;

generating an event signal; and transmitting the event signal.

7. The method of claim 6, wherein the environmental sensor comprises a passive infrared detector and the environmental condition comprises infrared radiation.

8. The method of claim 6, wherein the triggering event comprises human movement.

9. The method of claim 6, wherein the specified sampling rate is between 20 samples per second and 1,000 samples per second.

10. The method of claim 6, wherein the threshold number of environmental sensor samples comprises between 10 and 300 environmental sensor samples.

11. A system configured to detect a change in an environmental condition comprising:

an environmental sensor configured to detect an environmental condition;

sampling circuitry configured to sample the environmental sensor at a specified sampling rate;

a memory configured to store a plurality of samples generated by the sampling circuitry;

a pre-filter configured to:

perform a simplified analysis of the plurality of samples in the memory;

determine based on the simplified analysis that the plurality of samples indicate a potential change in the environmental condition; and generate a wake signal based on the plurality of samples indicating the potential change in the environmental condition;

a processor configured to:

receive the wake signal from the pre-filter;

wake from a low-power state based on the wake signal;

analyze the plurality samples in the memory to determine that a triggering event has occurred; and generate an event signal; and a transmitter configured to transmit the event signal.

12. The system of claim 11, wherein the environmental sensor comprises a passive infrared detector and the environmental condition comprises infrared radiation.

13. The system of claim 11, wherein the triggering event comprises human movement.

14. The system of claim 11, wherein the specified sampling rate is between 20 samples per second and 1,000 samples per second.

15. The system of claim 11, wherein the processor is further configured to wake each time a threshold number of environmental sensor samples are stored in the memory.

16. The system of claim 15, wherein the threshold number of environmental sensor samples comprises between 10 and 300 samples.

17. A method for detecting a change in an environmental condition comprising:

sampling, at a specified sampling rate, an environmental sensor configured to detect an environmental condition;

storing a plurality of samples representing the environmental condition in a memory;

analyzing, using a pre-filter, the plurality of samples in the memory;

determining, using the pre-filter, that the plurality of samples indicate a potential change in the environmental condition;

generating, using the pre-filter, a wake signal based on the plurality of samples indicating the potential change in the environmental condition;

receiving, at a processor, the wake signal from the pre-filter;

waking a processor from a low-power state based on the wake signal;

analyzing the plurality of environmental sensor samples in the memory to determine that a triggering event has occurred;

generating an event signal; and transmitting the event signal.

18. The method of claim 17, wherein the environmental sensor comprises a passive infrared detector and the environmental condition comprises infrared radiation.

19. The method of claim 17, wherein the triggering event comprises human movement.

20. The method of claim 17, wherein the specified sampling rate is between 20 samples per second and 1,000 samples per second.

21. The method of claim 17, further comprising:

generating the wake signal each time a threshold number of environmental sensor samples are stored in the memory.

22. The method of claim 21, wherein the threshold number of environmental sensor samples comprises between 10 and 300 samples.

* * * * *